(12) United States Patent
Mahoney

(10) Patent No.: US 7,327,274 B1
(45) Date of Patent: Feb. 5, 2008

(54) PROGRAMMABLE PANEL SCHEDULE

(76) Inventor: Mark D. Mahoney, 16404 Scorpion Dr., Fountain Hills, AZ (US) 85268

( * ) Notice: Subject to any disclaimer, the term of this patent is extended or adjusted under 35 U.S.C. 154(b) by 510 days.

(21) Appl. No.: 10/997,009

(22) Filed: Nov. 24, 2004

Related U.S. Application Data

(60) Provisional application No. 60/525,004, filed on Nov. 25, 2003.

(51) Int. Cl.
*G08B 21/00* (2006.01)
(52) U.S. Cl. .................. 340/639; 340/506; 700/17
(58) Field of Classification Search ................ 340/639, 340/657, 646, 691.6, 506, 658; 700/17
See application file for complete search history.

(56) References Cited

U.S. PATENT DOCUMENTS

| | | | | |
|---|---|---|---|---|
| 4,644,320 A | * | 2/1987 | Carr et al. | 340/310.16 |
| 5,386,117 A | * | 1/1995 | Piety et al. | 250/330 |
| 6,404,348 B1 | * | 6/2002 | Wilfong | 340/657 |
| 6,838,978 B2 | * | 1/2005 | Aizu et al. | 340/286.02 |
| 2002/0181178 A1 | * | 12/2002 | Ortiz et al. | 361/78 |

* cited by examiner

*Primary Examiner*—Phung T. Nguyen
(74) *Attorney, Agent, or Firm*—Venable, Campillo, Logan & Meaney, P.C.

(57) ABSTRACT

The programmable panel schedule is an apparatus for monitoring and modifying electrical circuits. The programmable panel schedule can eliminate the need to rely on paper schedules and permit a building engineer to instantly assess any monitored circuit for changes, additional capacity and usage history.

5 Claims, 2 Drawing Sheets

PROGRAMMABLE PANEL SCHEDULE

CROSS-REFERENCE TO RELATED APPLICATIONS

The present application claims priority to now abandoned U.S. provisional application entitled "Programmable Panel Schedule," having Ser. No. 60/525,004, filed by inventor Mark D. Mahoney on Nov. 25, 2003, which is entirely incorporated herein by reference.

FIELD OF THE INVENTION

The present invention relates generally to panel schedules and, more specifically, to programmable electric panel schedules.

DESCRIPTION

Figure 1:
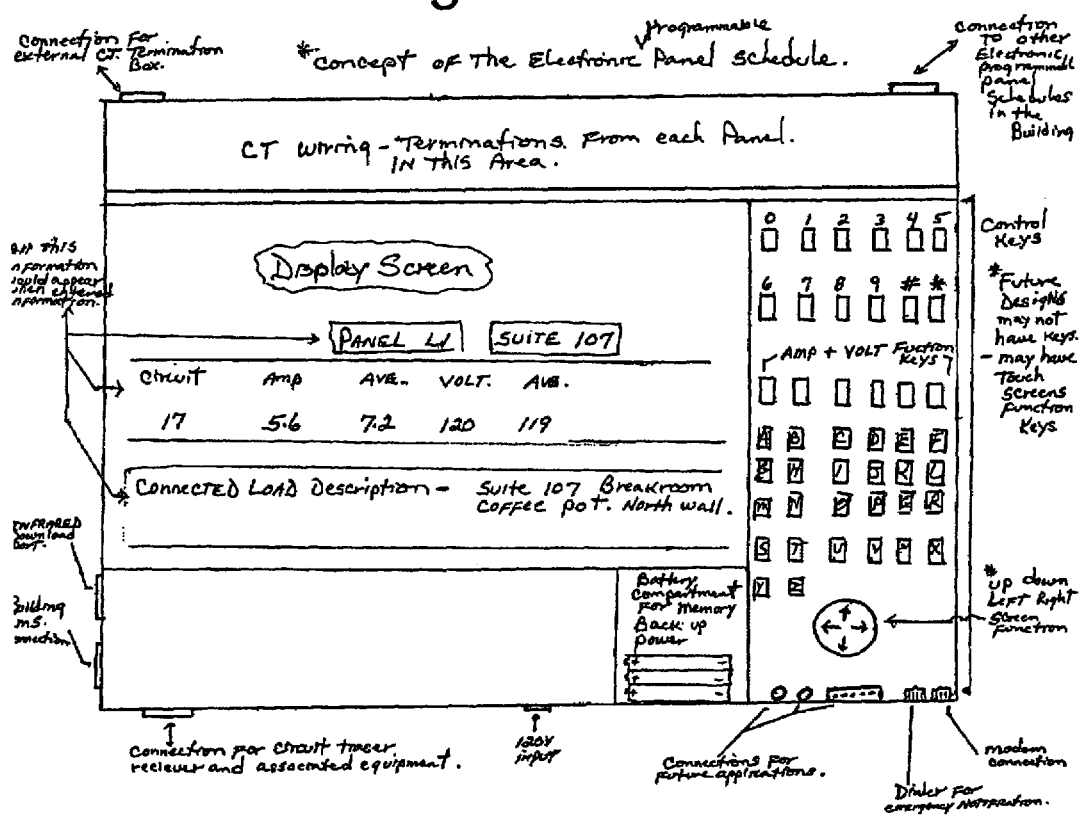
FIG. 1 illustrates the preferred embodiment of the programmable panel schedule.
Figure 2:
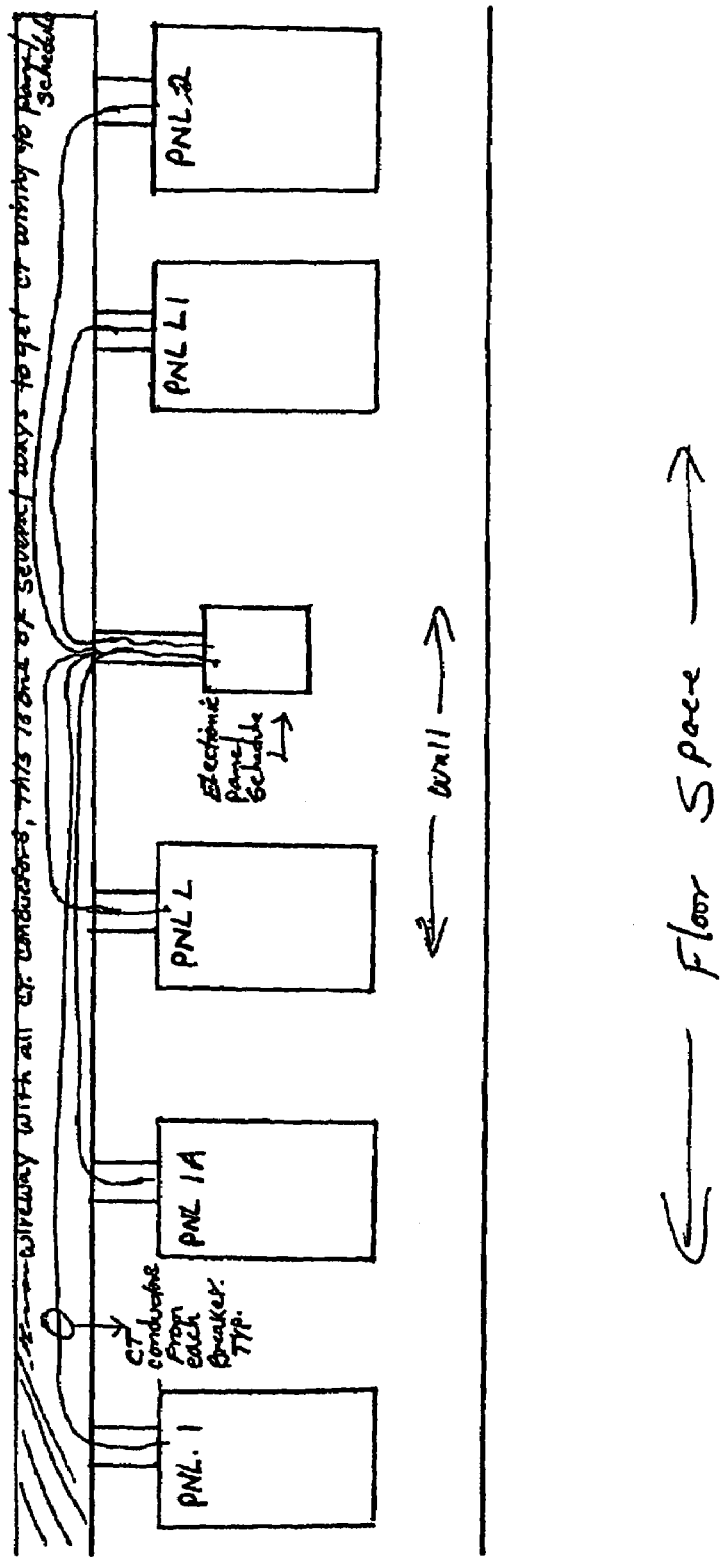
FIG. 2 illustrates the preferred embodiment of the programmable panel schedule connected to multiple electrical panels on one wall.

The invention is summarized below only for purposes of introducing embodiments of the invention. The ultimate scope of the invention is to be limited only to the claims that follow the specification. Although the invention is described in detail with reference to one or more particular preferred embodiments, persons possessing ordinary skill in the art to which this invention pertains will appreciate that various modifications and enhancements may be made without departing from the spirit and scope of the claims that follow.

Let me start by explaining what a regular, every day panel schedule is. If you open up a panel cover of an electrical breaker panel on the inside of the cover you would typically find a piece of paper with handwritten or typed description of what is being operated by each circuit breaker. Whether this panel schedule has been updated through the years after several additions to the building is anyone's guess.

This type of tracking system for commercial and industrial electrical circuits is nearly impossible to keep up with. In today's industry there is no alternative to this method. After nearly 30 years in the electrical trade relying on pieces of paper for accurate information this is the Programmable Panel Schedule I have developed.

Now imagine walking into an electrical room with several electrical panels lining the walls. An electrician is trying to determine what panel has a spare circuit, or which one has the least amount of load on the panel so he can run a new circuit to a copier, computer, etc.

He walks to the programmable panel schedule mounted in the most centrally located area in the room. Using the key pad, he pushes the key to give him the voltage of the panel he's looking for 120v, 208v, 277v, 480v, etc. Using the keys, he follows instructions in the screen to further his search. The panel schedule asks what voltage, amperage, and how many phases are needed to complete the electrical installation. After answering the prompts, he is shown what panel and what breaker space is available.

The building engineer that looks after every aspect of the building would need to be informed of new electrical loads added to panels. The programmable panel schedule has a communication port on the side of the panel that can be used to link the panel schedule to the building engineers Energy Management System (EMS). Nearly all commercial/industrial office—industry properties have some for of EMS that they can monitor and make adjustments to from their computers. EMS controls heating, cooling, motors, fans, etc.

The building engineer can monitor and make changes to the panel schedule from his computer or at the panel schedule itself by inputting a password. This keeps the panel schedule accurate by limiting inputs to memory to just a single user. Anyone else would be on read only, and could not make changes.

The property managers sometimes have a tenant that brings equipment in that requires more power than their lease agreement will allow. By installing CTs (current transformers) on each conductor on every circuit breaker, in every panel, the building engineer could be directed to monitor the kilowatt hours of additional power usage by a tenant and charge them accordingly.

By also installing CTs on the main feeder conductors feeding the panel, building engineers would be able to perform the 72 hour mandatory amp load test required by city building codes before electrical permits can be issued and plans can be approved for new office build outs. Independent tests cost $1200 or more per 72 hour test. This would cost the building nothing, or they could back charge the general contractor for this cost. Helping to pay back the cost for this system.

The paper style panel schedule is required to be in the panel before the inspector will pass the final inspection. A true current paper schedule could be printed out by the building engineer from his computer and then updated and re-printed at any time.

In office buildings coffee pots and other appliances are often left on after everyone goes home. Since every circuit has CTs connected at the breaker on one end and connected to the Electronic Panel Schedule on the other, including the EMS system. Alerts can be shown on the engineers monitor and automatically printed out, so that security on their rounds can puck up the printed out alert and resolve any potential problems.

Infrared testing of all electrical panels and transformers is very common today in commercial and industrial buildings. An additional communication port on the side of the electronic programmable panel schedule would allow the infrared thermographer to download all readings from his infrared equipment. Giving the building engineer stored readings and graphs that he can retrieve at any time through the EMS link from the programmable panel schedule to the engineer's EMS computer.

Building engineers would be able to assist tenants that need additional power to their suites. A tenant may not be aware that a receptacle on the wall is on a circuit that is not being used or even connected to any other outlet. From his computer the engineer would simply type in the suite number, then a layout of the suite would show on the screen, and outlets that are in that suite would show the panel number, circuit number and average amp draw or current amp draw. This would allow the engineer to suggest putting a certain piece of equipment in a certain place and utilize the suites current power situation to its full potential.

The tenant may from time to time have access to the electrical rooms, and would also be able to monitor amp draw from his computer room equipment. This is always a concern with large corporations with large computer rooms, since they cannot change any functions or previous inputs and are on read-only. Anyone concerned could benefit with this. The programmable panel schedule will be able to average and charge usage.

From the programmable panel schedule, one would be able to select their suite number and be able to read on the screen every circuit that is currently going to that suite, and will show where in that suite does each circuit go, as well as a description of the location of that circuit, receptacle, etc.

What to do with buildings that are already in bad shape as far as not knowing where any circuits go, and those missing paper panel schedules.

Taking a plug-in transmitter and plugging it into a receptacle would send the signal to the programmable panel schedule and automatically enter it as being a receptacle in that suite. Each and every receptacle would have this done. This would be fastest way to straighten out an existing building. Today's technology has devices that transmit signals, but you have to hold a receiver at the panel and move it up and down the breakers. Usually it comes down to "it could be this one or that one" as far as which breaker it is.

Paper panel schedules today are either missing, unreadable, whited out and written on again. With the Electronic Programmable Panel Schedule, clear precise descriptions of where a circuit goes and what it's being used for on a lighted screen is the future.

If you know your suite # you could key in a description—example—"Main Entrance Water Cooler" and then the circuit breaker # for the cover would appear using alphabet keys. This equipment has surge protection. Internal clock will show on screen when a power failure occurred and when power came on. Windows-based software. The electronic programmable schedule may be limited to how many CT conductors can be installed. A separate termination Box for the CTs would be needed, and a communication cable would be needed to connect the external CT box to the electronic programmable panel schedule.

What is claimed is:

1. A programmable panel schedule for viewing and modifying electrical circuits for a building comprising:
   a user-interface capable of displaying information and accepting user input,
   a current transformer connected to each conductor on a circuit to permit power usage to be monitored from the user interface, and
   a link to a energy management system,
   wherein a user can review and modify a panel schedule for a building from the user-interface.

2. The programmable panel schedule of claim 1 further comprising alerts to warn building engineers of circuit problems.

3. The programmable panel schedule of claim 1 further comprising a communication port coupled to the programmable panel schedule.

4. The programmable panel schedule of claim 3 wherein the communication port is capable of communicating with infrared thermographer equipment.

5. A programmable panel schedule for viewing and modifying electrical circuits for a building comprising:
   a user-interface capable of displaying information and accepting user input,
   a current transformer connected to each conductor on a circuit to permit load testing of the circuit, and
   a link to a energy management system,
   wherein a user can review and modify a panel schedule for a building from the user-interface.

\* \* \* \* \*